US009781657B2

(12) United States Patent
D'Angelo et al.

(10) Patent No.: US 9,781,657 B2
(45) Date of Patent: *Oct. 3, 2017

(54) METHODS, WIRELESS COMMUNICATION STATION, AND SYSTEM FOR WLAN CHANNEL SELECTION THROUGH BEACON REQUESTS

(71) Applicant: Intel Corporation, Santa Clara, CA (US)

(72) Inventors: Wilfrid D'Angelo, Mougins (KR); Oren Kaidar, Binyamina (IL); Adrian P Stephens, Cottenham (GB); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,962

(22) Filed: Feb. 26, 2016

(65) Prior Publication Data
US 2016/0323808 A1   Nov. 3, 2016

Related U.S. Application Data

(63) Continuation of application No. 13/712,243, filed on Dec. 12, 2012, now Pat. No. 9,277,585.

(51) Int. Cl.
*H04W 48/14* (2009.01)
*H04W 84/12* (2009.01)
*H04W 8/22* (2009.01)
*H04W 72/04* (2009.01)

(52) U.S. Cl.
CPC ............ *H04W 48/14* (2013.01); *H04W 8/22* (2013.01); *H04W 72/0453* (2013.01); *H04W 84/12* (2013.01)

(58) Field of Classification Search
CPC ...... H04W 76/02; H04W 88/08; H04W 88/10
See application file for complete search history.

(56) References Cited

U.S. PATENT DOCUMENTS

| 9,277,585 B2 | 3/2016 | D'angelo et al. |
| 2006/0217147 A1 | 9/2006 | Olvera-Hernandez et al. |
| 2007/0060067 A1 | 3/2007 | Ruuska |
| 2007/0243888 A1 | 10/2007 | Faccin |
| 2010/0103844 A1 | 4/2010 | Kim |
| 2010/0177718 A1 | 7/2010 | Harle et al. |
| 2011/0205990 A1 | 8/2011 | Inada |

(Continued)

FOREIGN PATENT DOCUMENTS

| WO | WO-2011122884 A2 | 10/2011 |
| WO | WO2014092792 A1 | 6/2014 |

OTHER PUBLICATIONS

"U.S. Appl. No. 13/712,243, Final Office Action mailed Aug. 13, 2015", 5 pgs.

(Continued)

*Primary Examiner* — Kevin C Harper
(74) *Attorney, Agent, or Firm* — Schwegman Lundberg & Woessner, P.A.

(57) ABSTRACT

Embodiments of a user station (STA) and methods for WLAN channel selection through beacon requests are generally described herein. In some embodiments, a STA requests that an access point (AP) transmit a beacon signal on a first sub-band. The first sub-band may include a channel of interest to the STA. The STA may determine that the AP supports the first sub-band if the AP transmits the requested beacon signal.

18 Claims, 6 Drawing Sheets

(56) References Cited

U.S. PATENT DOCUMENTS

| | | | |
|---|---|---|---|
| 2012/0094621 A1* | 4/2012 | Moelker | H04B 1/406 |
| | | | 455/90.2 |
| 2012/0166671 A1 | 6/2012 | Qi et al. | |
| 2013/0051328 A1 | 2/2013 | Chandra | |
| 2013/0235852 A1 | 9/2013 | Segev et al. | |
| 2014/0161051 A1 | 6/2014 | D'angelo et al. | |

OTHER PUBLICATIONS

"U.S. Appl. No. 13/712,243, Non Final Office Action mailed Feb. 10, 2015", 9 pgs.

"U.S. Appl. No. 13/712,243, Non Final Office Action mailed Jul. 8, 2014", 8 pgs.

"U.S. Appl. No. 13/712,243, Notice of Allowance mailed Oct. 22, 2015", 7 pgs.

"U.S. Appl. No. 13/712,243, Response filed May 8, 2015 to Non Final Office Action mailed Feb. 10, 2015", 10 pgs.

"U.S. Appl. No. 13/712,243, Response filed Oct. 7, 2014 to Non-Final Office Action dated Jul. 8, 2014", 10 pgs.

"U.S. Appl. No. 13/712,243, Response filed Oct. 13, 2015 to Final Office Action mailed Aug. 13, 2015", 8 pgs.

"International Application Serial No. PCT/US2013/047915, International Preliminary Report on Patentability mailed Jun. 25, 2015", 7 pgs.

"International Application Serial No. PCT/US2013/047915, International Search Report mailed Oct. 21, 2013", 4 pgs.

"International Application Serial No. PCT/US2013/047915, Written Opinion mailed Oct. 21, 2013", 5 pgs.

\* cited by examiner

Figure 1:
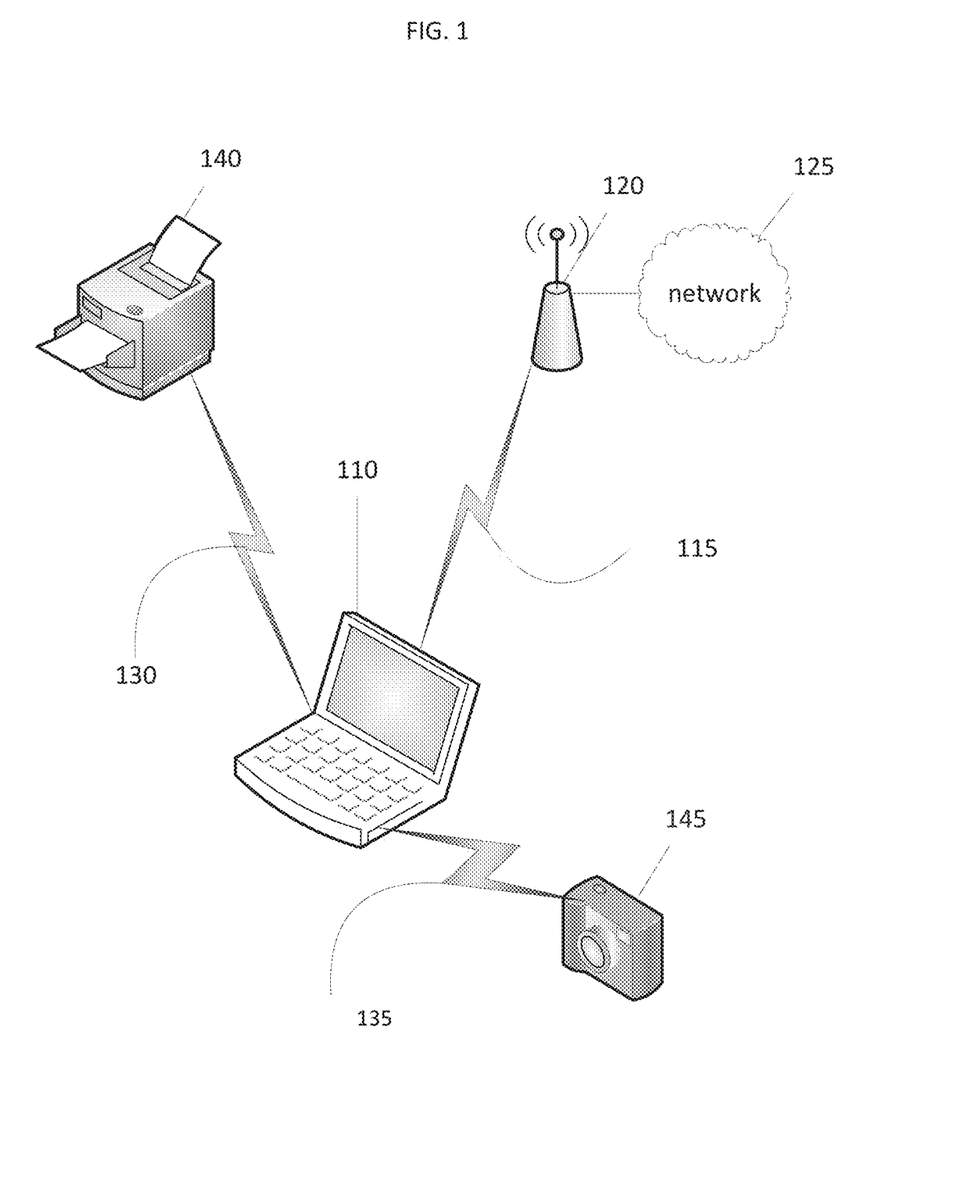
FIG. 1 illustrates a wireless local area network (WLAN) in which example embodiments are implemented.

FIG. 6 ns, the user STA 110 and the AP 120 may transmit and/or receive communications in accordance with specific communication standards, such as the IEEE 802.11 standards although user STA 110 and the AP 120 may also be suitable to transmit and/or receive communications in accordance with other techniques.

The user STA 110 may further have connections 130 and 135 to other wireless devices such as, for example, a printer 140 and a camera 145. However, any number of wireless devices, or no wireless devices, may have connections to the user STA 110. The user STA 110 may act or be capable of acting as a peer-to-peer (P2P) group owner (GO) of the group comprised of the printer 140, the user STA 110, the camera 145 or other wireless devices (not shown).

The user STA 110 may be arranged to operate on a first set of one or more sub-bands within a WLAN spectrum. The AP 120 may be arranged to operate on a second set of one or more sub-bands within the WLAN spectrum. The WLAN spectrum may include channels within frequency ranges specified in accordance with a standard of the 802.11 family of standards. For example, the WLAN spectrum may include channels or sub-bands within a 2.4-gigahertz (GHz) band, a 5-GHz band, or a 60-GHz band. The first set of sub-bands, supported by the user STA 110, may include the same sub-bands that are included in the second set of sub-bands supported by the AP 120. Alternatively, the first set may include more sub-bands than the second set, or the second set may include more sub-bands than the first set.

The allowable WLAN spectrum may vary based on geographic considerations. For example, national regulations may permit spectrum usage at 5.8 GHz in the United States, while the 5.8 GHz band may not be used in the European Union. Some equipment manufacturers therefore may provide different STAs for usage in different geographical locations. Other equipment manufacturers may provide a "worst-case scenario" STA that can function in any geographical location, on a reduced set of sub-bands or with reduced functionality. Accordingly, logistical supply complications may be introduced, or the user experience may be degraded.

Under some reduced functionalities, a user STA 110 may not transmit on a sub-band or channel unless or until the user STA 110 has observed or received a beacon signal from an AP 120 on that sub-band. Accordingly, the user STA 110 is limited to transmissions on particular sub-bands for which the AP 120 has transmitted a beacon signal. However, either or both of the AP 120 and the user STA 110 may support communications on other sub-bands. Additionally, conditions may be advantageous to the user STA 110 on other sub-bands besides those sub-bands on which the AP 120 is transmitting beacon signals. For example, other sub-bands may have reduced or no traffic or provide better channel quality.

Figure 2:
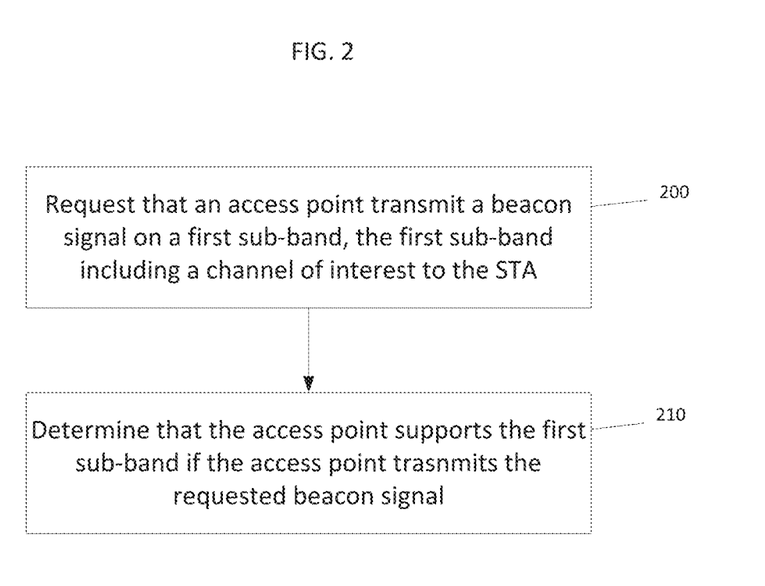
FIG. 2 is a flow diagram of a procedure performed by a user STA for operation in a wireless communication network, in accordance with some embodiments.

In accordance with example embodiments, therefore, the user STA 110 may request that the AP 120 transmit a beacon signal on a given sub-band, so that the user STA 110 may thereafter communicate over that sub-band. FIG. 2 illustrates a method, performed by the user STA 110, for operating in a wireless network.

Referring to FIG. 2, in operation 200, the user STA 110 may request that an AP 120 transmit a beacon signal on a first sub-band. The first sub-band may include a channel of interest to the user STA 110. The user STA 110 may request the beacon signal by transmitting a beacon request frame to the AP 120. The user STA 110 may transmit the beacon request frame on a second sub-band. The second sub-band may be a sub-band on which the AP 120 has already

METHODS, WIRELESS COMMUNICATION STATION, AND SYSTEM FOR WLAN CHANNEL SELECTION THROUGH BEACON REQUESTS

TECHNICAL FIELD

Embodiments pertain to communication networks. Some embodiments pertain to wireless devices operating in wireless local area networks (WLANs) in accordance with Institute of Electrical and Electronics Engineers (IEEE) 802.11 family of standards.

BACKGROUND

The IEEE has adopted a set of standards for WLANs, known as 802.11. Under 802.11, a user device, also known as a user station (STA), may access a WLAN through an access point (AP). The user STA may transmit in those sub-bands of the regulatory WLAN frequency spectrum in which the user STA has already received signaling from the AP. Therefore, sub-band use may be limited according to the signaling provided by the AP.

Accordingly, there is a general need for a user STA to perform methods to switch sub-bands for transmission based on the needs of the user STA.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a user wireless communication station (STA) 110. The user STA 110 may be, for example, a laptop computer, a smart phone, a tablet computer, or any other wireless device. In an example, the user STA 110 has a wireless connection 115 through a second STA 120 to the network 125. The second STA 120 may be a more stationary communication unit such as a wireless access point (AP) and will hereinafter be referred to as the AP 120. The network 125 may be a home network, an enterprise network, the Internet, or any other suitable network. In some emboditransmitted a beacon signal, thus permitting user STA 110 transmissions on the second sub-band. A beacon request frame in accordance with example embodiments is shown in FIG. 3.

Figure 3:
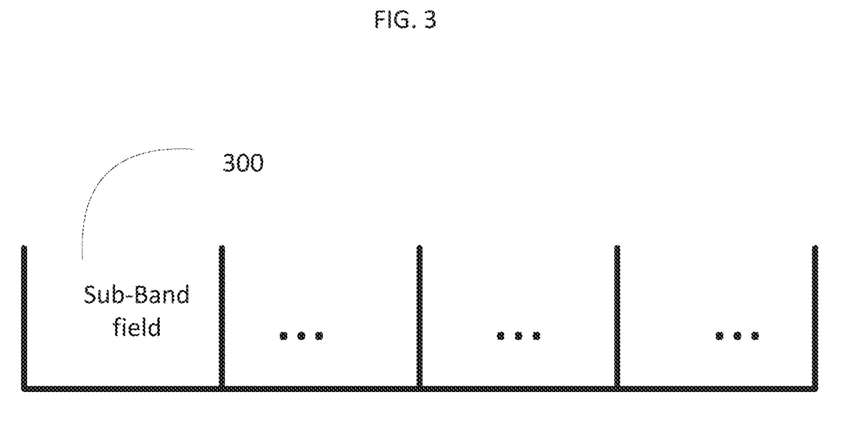
FIG. 3 illustrates a beacon request frame in accordance with some embodiments.

Referring to FIG. 3, the beacon request frame may include a sub-field 300 indicating the identity of the first sub-band for which the user STA 110 is requesting a beacon signal. The beacon request frame may include additional fields in accordance with a standard of the IEEE 802.11 family of standards.

Referring again to FIG. 2, in operation 210, the user STA 110 may determine that the AP 120 supports the first sub-band if the AP 120 transmits the requested beacon signal. The user STA 110 may determine that the AP 120 does not support the first sub-band if the AP 120 indicates that the AP 120 does not support the first sub-band or if no response is received to the beacon request frame within a time duration. Upon determining that the AP 120 does not support the first sub-band, the user STA 110 may transmit a beacon request frame to request a beacon signal on a different sub-band. The different sub-band may include a different channel of interest to the user STA 110.

The user STA 110 may determine a sub-band for which to request transmission of the beacon signal based on geographically specific signaling from the AP 120. The geographically specific signaling may be, for example, country information signaling according to a standard of the IEEE 802.11 family of standards.

Figure 4:
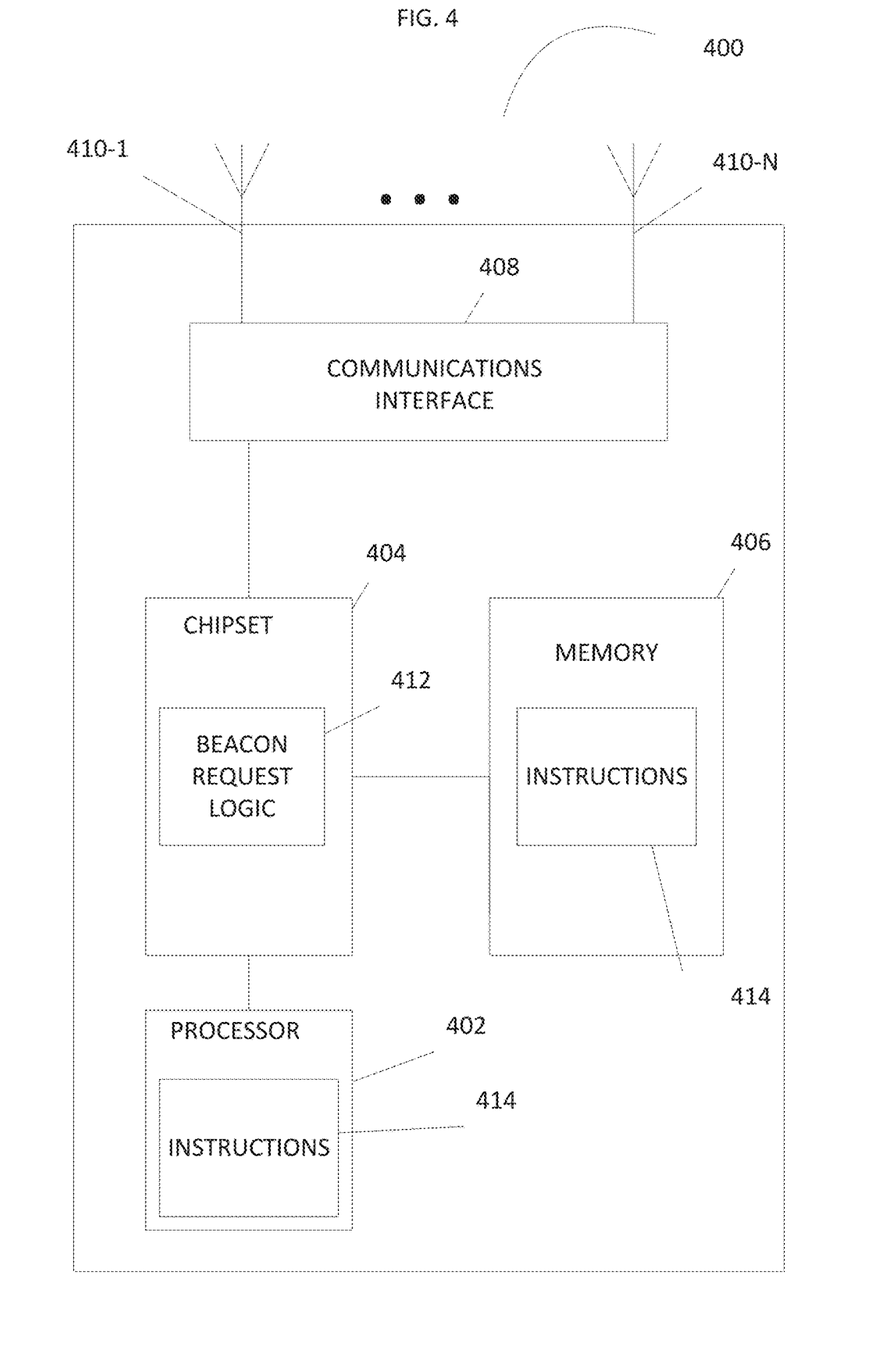
FIG. 4 illustrates a functional block diagram of a communication station (STA), in accordance with some embodiments.

FIG. 4 illustrates a functional block diagram of a STA 400, in accordance with some embodiments. The STA 400 may be suitable as a user STA 110 (FIG. 1) or as an AP 120 (FIG. 1). The STA 400 may support methods for operating in a wireless communication network, in accordance with embodiments. The STA 400 may include a processor 402, which uses a chipset 404 to access on-chip state memory 406, as well as a communications interface 408. In one embodiment the memory 406 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 408 is, for example, a wireless Physical Layer (PHY), which operates according to a multiple input/multiple output (MIMO) operation. The communications interface 408 may receive geographical information. The geographical information may be received from the AP 120. When the STA 400 acts as a user STA 110 (FIG. 1), the communications interface 408 may use a first sub-band to transmit the beacon request frame to a second STA. As discussed above, the second STA may be the AP 120. The beacon request frame may request that the AP 120 transmit a beacon signal on a second sub-band. The communications interface 408 may receive, on the second sub-band, a beacon signal in response to the beacon request frame. The communications interface 408 may receive geographical information. The geographical information may be received from the AP 120. The communications interface 408 may receive an acknowledgement (ACK) from the AP 120 in response to the beacon request frame.

The chipset 404 may incorporate therein Beacon Request Logic 412 to, for example, configure a beacon request frame or to configure a response to a beacon request frame. In an embodiment, the chipset 404 provides MAC layer functionality. For example, the chipset 404 may provide MAC layer functionality to configure a beacon request frame or to configure a response to a beacon request frame.

When the STA 400 operates as a user STA 120, the processor 402 may be arranged to determine the sub-band for which to transmit the beacon request frame based on a channel of interest of the STA 400. The processor 402 may be arranged to select the channel of interest based on geographical information received through the communications interface 408. The processor 402 may determine that the requested sub-band is not supported if the communications interface 408 does not receive the requested beacon signal within a time duration. The processor 402 may determine that the requested sub-band is not supported if the communications interface 408 does not receive the requested beacon signal within a time duration after the communications interface 408 received the ACK to the beacon request frame.

When the STA 400 operates as an AP 120 (FIG. 1), the communications interface 408 may receive, on a first sub-band, a beacon request frame requesting transmission of a beacon signal on a second sub-band. The communications interface 408 may transmit the beacon signal on the second sub-band upon determining whether to support communication on the second sub-band. The communications interface 408 may transmit, on the second sub-band, an acknowledgement (ACK) message in response to the beacon request frame. The communications interface 408 may transmit, on the first sub-band, a response denying service on the second sub-band.

When the STA 400 operates as an AP 120, the processor 402 may determine whether to support communication in the second sub-band. The communications interface 408 may transmit the beacon signal within a time duration of the transmission of the ACK message upon determination by the processor 402 to support communication in the second sub-band.

Embodiments may be implemented in one or a combination of hardware, firmware and software. Embodiments may also be implemented as instructions 414 stored on a computer-readable storage device, which may be read and executed by at least one processor 402 to perform the operations described herein. In some embodiments, the instructions 414 are stored on the processor 402 or the memory 406 such that the processor 402 and the memory 406 act as computer-readable mediums. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

Although the STA 400 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the STA 400 may refer to one or more processes operating on one or more processing elements.

The STA 400 may include multiple transmit and receive antennas 410-1 through 410-N, where N is a natural number. Antennas 410-1 through 410-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 410-1 through 410-N may be effectively separated to take advantage of spatial diversity and the different channel characteristics that may result between each of antennas 410-1 through 410-N and the antennas of an originator STA. In some MIMO embodiments, antennas 410-1 through 410-N may be separated by up to 1/10 of a wavelength or more.

Figure 5:
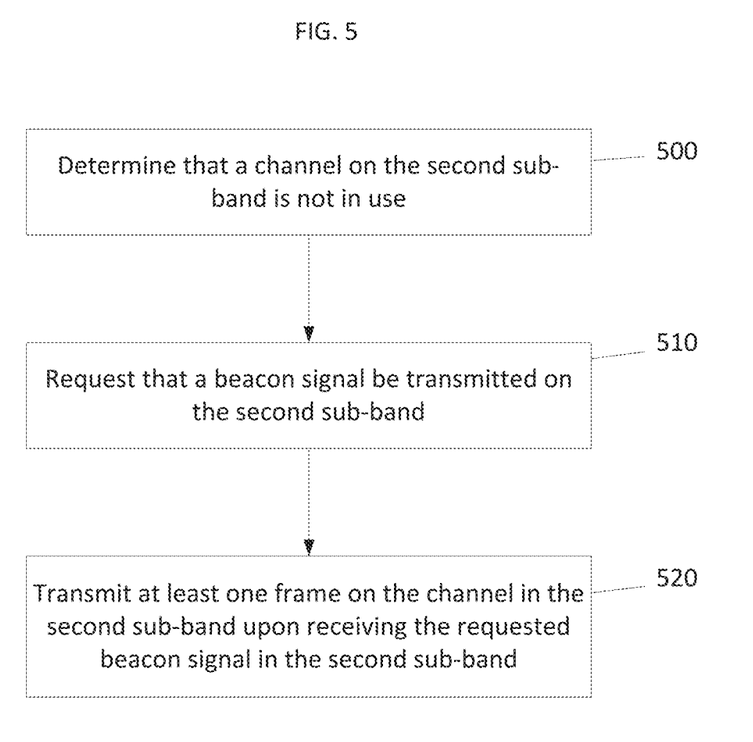
FIG. 5 is a flow diagram of a procedure for switching from a first sub-band to a second sub-band in a wireless communication network in accordance with some embodiments.

FIG. 5 illustrates a method, performed by the user STA 110, for switching from a first sub-band to a second sub-band in a wireless communication network. In operation 500, the user STA 110 may determine that a channel on the second sub-band is not in use. In operation 510, the user STA 110 may request that a beacon signal be transmitted on the second sub-band. The request may include transmission, on the first sub-band, of a request signal as described above with respect to FIG. 3. In operation 520, the user STA 110 may transmit at least one frame on the channel in the second sub-band upon receiving the requested beacon signal in the second sub-band. The user STA 110 may further become a peer-to-peer (P2P) group owner (GO), over a group comprising, for example, the printer 140 (FIG. 1), the camera 145 (FIG. 1) or other wireless devices (not shown). The user STA 110 may become a GO by transmitting a beacon signal on the second sub-band to the printer 140, the camera 145, or to other wireless devices. As the GO, the user STA 110 may establish associations with and communications between the printer 140, the camera 145, or other wireless devices.

Figure 6:
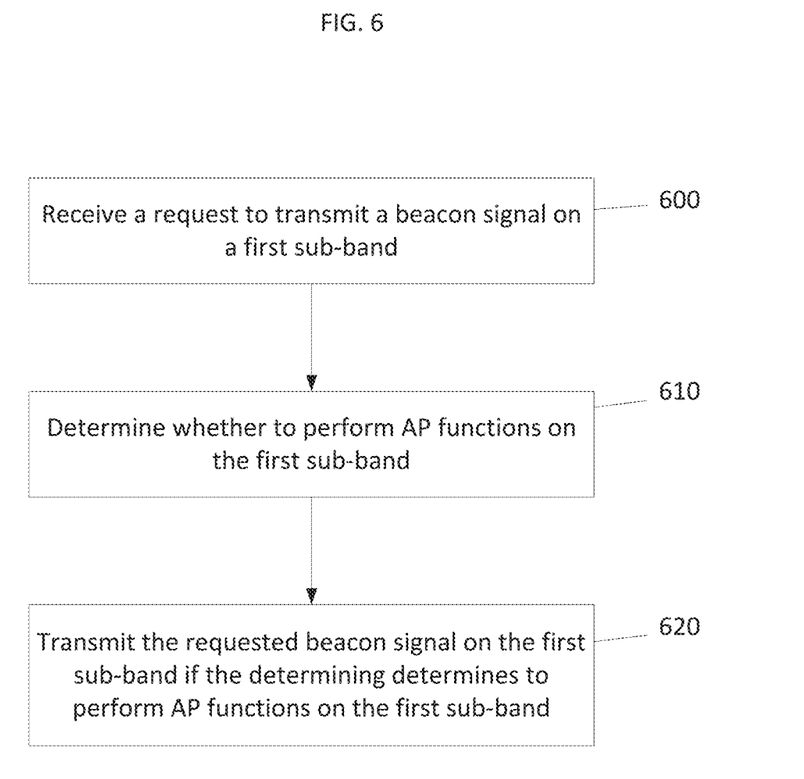
FIG. 6 is a flow diagram of a procedure performed by an access point (AP) for operating in a wireless communication network in accordance with some embodiments.

FIG. 6 illustrates a method, performed by the AP 120, of operating in a wireless communication network. In operation 600, the AP 120 may receive a request to transmit a beacon signal on a first sub-band. In operation 610, the AP 120 may determine whether the AP 120 can perform AP functions on the first sub-band. In operation 620, the AP 120 may transmit the requested beacon signal on the first sub-band if the AP 120 determines that the AP 120 might possibly perform AP functions on the first sub-band.

In at least one embodiment, if the AP 120 decides the AP 120 cannot support AP functions on the first sub-band, the AP 120 may transmit a response denying service on the first sub-band. The AP 120 may transmit this response on a sub-band at which the AP 120 is already providing service. For example, the AP 120 may transmit this response on the sub-band on which the AP 120 received the request for the beacon signal. In at least another embodiment, the AP 120 may ignore the request for the beacon signal if the AP 120 decides the AP 120 cannot support AP functions on the first sub-band. The AP 120 may limit determinations of whether to perform AP functions on the first sub-band. For example, the AP 120 may limit the number of determinations made to a certain maximum over a time interval. Further, or in addition, the AP 120 may limit transmissions of the requested beacon signal to a number of transmissions within a time interval. The AP 120 may transmit an acknowledgement (ACK) message upon receiving a request for a beacon signal.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user station (STA), the apparatus comprising:
   memory; and
   processing circuitry to:
      receive at least one beacon signal frame on a first sub-band;
      encode a request signal to be transmitted to an access point (AP) to request that the AP transmit a beacon signal on a second sub-band subsequent to and conditioned upon receiving the at least one beacon signal frame on the first sub-band, wherein the requesting includes transmitting a request signal on the first sub-band, wherein the second sub-band is different from the first sub-band; and
      determine that the AP supports the second sub-band if the AP transmits the requested beacon signal on the second sub-band.

2. The apparatus of claim 1, wherein the transmission sub-band is within one of a 5.2 GHz frequency band or a 5.8 GHz frequency band.

3. The apparatus of claim 2, wherein the second sub-band is within another of the 2 GHz frequency band or the 8 GHz frequency band.

4. The apparatus of claim 2, wherein the request signal includes a field indicating the second sub-band.

5. The apparatus of claim 2, further comprising:
   transceiver circuitry to:
      transmit the request signal, and receive the requested beacon signal on the second sub-band; and
   one or more antennas coupled to the transceiver circuitry.

6. The apparatus of claim 2, wherein the second sub-band is determined based on geographic location information of the STA, and wherein the memory is configured to store geographic location information of the STA.

7. A non-transitory computer-readable medium to store instructions executed by a user station (STA) to:
   receive at least one beacon signal frame on a first sub-band;
   encode a request signal to be transmitted to an access point (AP) to request that the AP transmit a beacon signal on a second sub-band subsequent to and conditioned upon receiving the at least one beacon signal frame on the first sub-band, wherein the requesting includes transmitting a request signal on the first sub-band, wherein the second sub-band is different from the first sub-band, the second sub-band being selected based on geographic information of at least one of the STA and the AP; and
   determine that the AP supports the second sub-band if the AP transmits the requested beacon signal on the second sub-band.

8. The non-transitory computer-readable medium of claim 7, wherein the request signal for transmission on a transmission sub-band different from the second sub-band.

9. The non-transitory computer-readable medium of claim 8, wherein the transmission sub-band is within one of a 5.2 GHz frequency band or a 5.8 GHz frequency band and the second sub-band is within another of the 5.2 GHz frequency band or the 5.8 GHz frequency band.

10. The non-transitory computer-readable medium of claim 7, wherein the request signal includes a field indicating the second sub-band.

11. An apparatus for an access point (AP), the apparatus comprising:
  memory to store geographic information for the AP; and
  processing circuitry to:
    encode a beacon signal for transmission on a first sub-band;
    decode a request signal received from a user station (STA) on the first sub-band, the request signal including a field to indicate a requested sub-band, different from the first sub-band, on which the STA desires to receive beacon signals;
    determine, based on geographic information of the AP, whether the AP supports the requested sub-band; and
    encode a beacon signal for transmission on the requested sub-band if the AP supports the requested sub-band.

12. The apparatus of claim 11, wherein the first sub-band is within one of a 5.2 GHz frequency band or a 5.8 GHz frequency band.

13. The apparatus of claim 12, wherein the requested sub-band is within another of the 5.2 GHz frequency band or the 5.8 GHz frequency band.

14. The apparatus of claim 11, wherein the AP is additionally configured for operation on a 60 GHz frequency band.

15. The apparatus of claim 11, wherein the processing circuitry is further configured to encode geographic information and country-based information for transmission to the STA.

16. A non-transitory computer readable medium to store instructions executed by an access point (AP) to:
  encode a beacon signal for transmission on a first sub-band;
  decode a request signal received from a user station (STA) on the first sub-band, the request signal including a field to indicate a requested sub-band, different from the first sub-band, on which the STA desires to receive beacon signals;
  determine, based on geographic information of the AP, whether the AP supports the requested sub-band; and
  encode a beacon signal for transmission on the requested sub-band if the AP supports the requested sub-band.

17. The non-transitory computer readable medium of claim 16, wherein the first sub-band is within one of a 5.2 GHz frequency band or a 5.8 GHz frequency band, and wherein the requested sub-band is within another of the 5.2 GHz frequency band or the 5.8 GHz frequency band.

18. The non-transitory computer readable medium of claim 16, wherein instructions further configure the AP to encode geographic information and country-based information for transmission to the STA.

* * * * *

UNITED STATES PATENT AND TRADEMARK OFFICE
CERTIFICATE OF CORRECTION

PATENT NO. : 9,781,657 B2  
APPLICATION NO. : 15/054962  
DATED : October 3, 2017  
INVENTOR(S) : D'Angelo et al.

Page 1 of 1

It is certified that error appears in the above-identified patent and that said Letters Patent is hereby corrected as shown below:

On the Title Page

Item (72), in "Inventors", in Column 1, Line 1, delete "(KR);" and insert --(FR);-- therefor In the Claims In Column 6, Line 29, in Claim 4, delete "claim 2," and insert --claim 1,-- therefor In Column 6, Line 31, in Claim 5, delete "claim 2," and insert --claim 1,-- therefor In Column 6, Line 36, in Claim 6, delete "claim 2," and insert --claim 1,-- therefor Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*